J. HOSKIN.
Pipe-Joints.
No. 157,828. Patented Dec. 15, 1874.
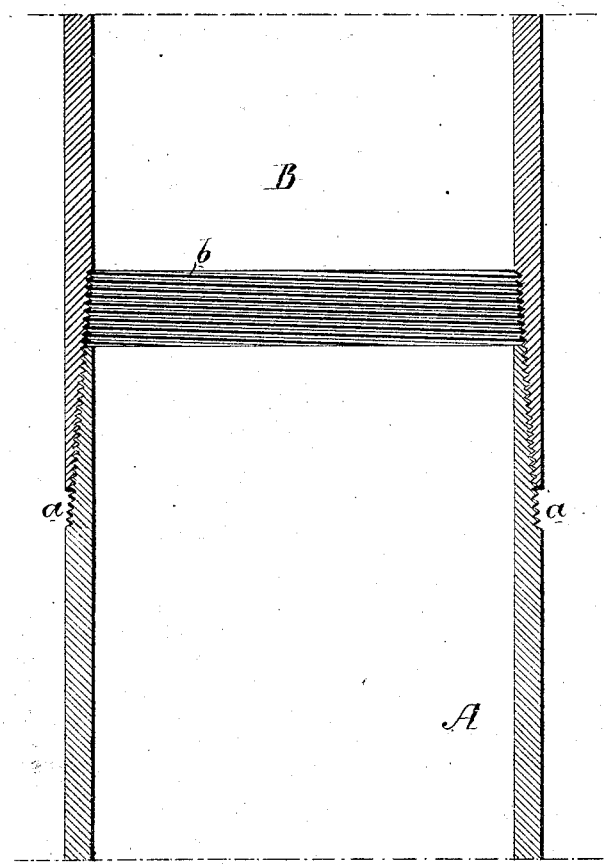
Witnesses, Hubert Howson
Thomas McIlvain
John Hoskin
by his Attys.
Howson & Son

UNITED STATES PATENT OFFICE.

JOHN HOSKIN, OF PHILADELPHIA, PENNSYLVANIA.

IMPROVEMENT IN PIPE-JOINTS.

Specification forming part of Letters Patent No. 157,828, dated December 15, 1874; application filed November 14, 1874.

*To all whom it may concern:*

Be it known that I, JOHN HOSKIN, of Philadelphia, Pennsylvania, have invented an Improved Pipe-Joint, of which the following is a specification:

The object of my invention is to so connect tubes of artesian wells together that there shall be no external projection to interfere with the driving of the coupled tubes; and this object I attain in the manner which I will now proceed to describe, reference being had to the accompanying drawing, which represents a vertical section of parts of two tubes, coupled together in accordance with my invention.

On one end of one tube, A, I form a tapering screw-thread, $a$, and on the inside of the adjoining tube, B, I form a similar thread, $b$, of corresponding taper, and I screw the two tubes so securely together as to make a perfectly tight joint, which is of sufficient strength to resist the vertical strain (the only strain) to which the tubes are subjected, and possesses the great advantage of dispensing with the protuberant collars or couplings, which are common to the joints of tubes of this class, and which interfere more or less with the driving of such tubes.

My improved joint in no way interferes with the continuity of the parallelism of the coupled tubes, which can, consequently, be easily driven.

I claim as my invention—

The within-described tube-joint, consisting of an external tapering thread on one tube, and a corresponding internal tapering thread in the adjoining tube, that the continued parallelism of the sides of the tubes may not be interrupted at the joints, all as set forth.

In testimony whereof I have hereunto signed my name to this specification in the presence of two subscribing witnesses.

JOHN HOSKIN.

Witnesses:
ED. H. ZITZMAN,
WM. SHEARER.